US010943222B2

(12) United States Patent
Amos et al.

(10) Patent No.: US 10,943,222 B2
(45) Date of Patent: Mar. 9, 2021

(54) DEVICES AND METHODS FOR PAYMENT HANDLING

(71) Applicant: NCR Corporation, Duluth, GA (US)

(72) Inventors: Mervin Amos, London (GB); Monish Meiappan, Croydon (GB)

(73) Assignee: NCR Corporation, Atlanta, GA (US)

( * ) Notice: Subject to any disclaimer, the term of this patent is extended or adjusted under 35 U.S.C. 154(b) by 860 days.

(21) Appl. No.: 14/499,365

(22) Filed: Sep. 29, 2014

(65) Prior Publication Data
US 2016/0092857 A1 Mar. 31, 2016

(51) Int. Cl.
G06Q 20/10 (2012.01)
G06Q 20/22 (2012.01)
G06Q 20/08 (2012.01)
G06Q 20/02 (2012.01)
G06Q 30/00 (2012.01)

(52) U.S. Cl.
CPC ............ G06Q 20/22 (2013.01); G06Q 20/02 (2013.01); G06Q 20/0855 (2013.01); G06Q 30/00 (2013.01)

(58) Field of Classification Search
USPC .................................................. 705/35-44
See application file for complete search history.

(56) References Cited

U.S. PATENT DOCUMENTS 10,354,247 B2 * 7/2019 Royyuru ............... G06Q 20/38
2013/0204785 A1 * 8/2013 Monk .................. G06Q 20/322
705/44
2013/0254110 A1 * 9/2013 Royyuru ............... G06Q 20/36
705/44
2015/0081728 A1 * 3/2015 Rosenberg ......... G06Q 10/0633
707/756
2019/0272545 A1 * 9/2019 Ozvat ................... G06Q 20/20

OTHER PUBLICATIONS

Applying a Technology Acceptance Model to Test Business e-Loyalty Towards Online Banking Transactions 1 by Eva Martinez-Caro; Gabriel Cepeda-Carrion [Sep. 2013] (Year: 2013).*
A framework for scientific data management in the cloud by Kantere, Verena. Proceedings of the International Conference on Scientific Computing (CSC); Athens : 73-79. Athens: The Steering Committee of The World Congress in Computer Science, Computer Engineering and Applied Computing (2013) (Year: 2013).*
Business Optimization Through a Port E-Commerce by Soava, Georgeta; Raduteanu, Mircea Alexandru. Proceedings of the International Conference on Modeling, Simulation and Visualization Methods (MSV); Athens : 1-7. Athens: The Steering Committee of The World Congress in Computer Science, . . . computing. (Year: 2012).*

* cited by examiner

Primary Examiner — Hani M Kazimi
Assistant Examiner — Hatem M Ali
(74) Attorney, Agent, or Firm — Schwegman, Lundberg & Woessner

(57) ABSTRACT

A method can include receiving a first payment from a first payment terminal in a first format, converting the first payment to a unified format, receiving a second payment from a second payment terminal in a second format different from the first format, and converting the second payment to the unified format.

20 Claims, 5 Drawing Sheets

DEVICES AND METHODS FOR PAYMENT HANDLING

BACKGROUND

A payment terminal can include a Self-Service Terminal (SST) (e.g., an Automated Teller Machine (ATM), a web-based payment device, a self-service cash register, or other unattended payment terminal) or a Point of Sale (POS) device (e.g., a cash register with an attendant, a credit card payment machine, or other human attended payment terminal). The payment terminal can provide a customer an ability to submit a payment to a payment recipient, such as a retail merchant, a credit card vendor, bank, other financial institution, or other payment recipient.

SUMMARY

In various embodiments, payments in a variety of formats can be converted to a unified format. The payments in the unified format can be converted to a format specified by a payment recipient. In accord with one or more embodiments, the variety of formats can include a Web Services format or an Extensible Markup Language (XML) format, among others.

DETAILED DESCRIPTION

Generally discussed herein are systems and methods for converting a payment from one format of a variety of formats to another format (e.g., a unified format). The payments in the unified format can be converted to a variety of other formats, such as a format compatible with a credit card vendor or other payment recipient.

The methods and systems discussed can be implemented in a legacy device, such as by modifying the legacy device to include hardware, software, firmware, or a combination thereof to implement the operations of a system or method discussed. The methods and systems discussed can be implemented in a non-legacy or stand-alone device.

A payment can be designed to account for a low bandwidth communications channel. Such as payment can be concise in nature to ensure successful transmission without requiring costly communications infrastructure. In the case of some payment terminals, a payment communication can include the use of a dial-up modem.

As computer bandwidth increases and is available for communicating a payment, new communications protocols are created that use some of the increased bandwidth. The increased bandwidth provides a medium through which to transmit payments (i.e. in the form of messages) that include more data than was previously possible.

Converting a payment in the previously unsupported format can be cumbersome and can require specialized knowledge of the new format. Also, converting from one payment format to a unified format is different from converting from another payment format to the unified format, thus requiring different conversion rules for such payment conversions. Automating such conversions can help overcome one or more difficulties associated with manually converting a payment, such as by reducing errors produced by the manual process or reducing costs associated with the conversion by reducing the number of human hours involved in performing the conversion.

One such previously unsupported payment format can include a Web Services or an XML format. These formats can be handled by writing code specialized to handle such a payment. However, writing such code is time consuming and can require specialist knowledge of the message format and definitions. A disadvantage to such an approach is that every time a new message format is created, more code needs to be written to handle the message format. It can be advantageous to have a single platform that can transform a message in a variety of formats to a variety of other formats.

Figure 1:
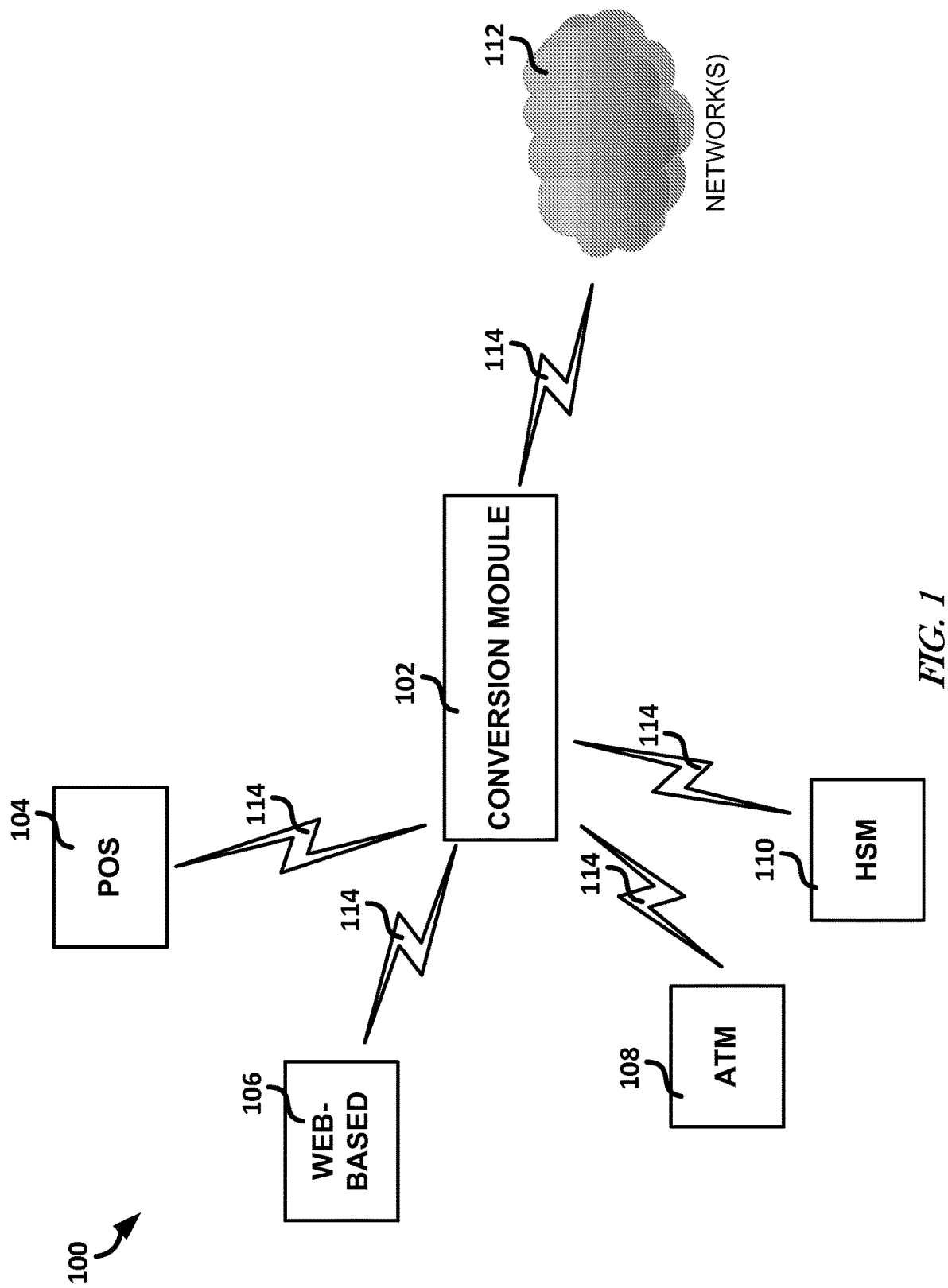
FIG. 1 is a block diagram of an example of a payment conversion system, in accord with one or more embodiments.

FIG. 1 shows a block diagram of an example of a payment converter system 100, in accord with one or more embodiments. The payment converter system 100 can include a conversion module 102 communicatively coupled to one or more payment terminals. The payment terminals, as depicted in FIG. 1, can include a POS device 104, a web-based device 106, and an ATM 108. The conversion module 102 can be communicatively coupled to a Hardware Security Module (HSM) 110. The HSM 110 can help protect a payment processed by a payment terminal or the conversion module 102, such by using encryption or other access inhibiting operation. The conversion module 102 can be communicatively coupled to one or more networks 112. A communication 114, such as depicted in FIG. 1, can include a wired or wireless communication. Other payment terminals can include a kiosk, a self-service checkout terminal, or a cashier assisted checkout terminal, among others.

The conversion module 102 can receive a payment, such as in the form of a payment message, from the POS device 104, the web-based device 106A-B, or the ATM 108. The conversion module 102 can convert (e.g., automatically convert) a received payment from a format in which the payment is received to another format, such as a unified format. The conversion module 102 can convert a converted message to another format that can be compatible with a credit card vendor, bank, another financial institution, or another entity that is the recipient of the respective payment. More details regarding the conversion module 102 are described with regard to FIG. 2.

As used herein, "automatic" or "automatically" means without human interference. In one or more embodiments, "automatic" also means by itself. Thus, "the conversion module 102 automatically converting" means it converts a payment without human interference, by itself, or both.

The POS device 104 can include a checkout (e.g., a "cash register" as a checkout is commonly called) or electronic POS (EPOS) device. The POS device 104 is typically at a location in a retail establishment where a customer makes a payment to a payment recipient (e.g., a merchant) in exchange for a good or service. The POS device 104 for one retail establishment can communicate a payment to a payment recipient in a format that is different than the payment communication from another merchant. For example, a POS device 104 can communicate a payment in an ISO 8583 format. The ISO 8583 format is a standard communication protocol for a system that governs exchanges of electronic transactions made by a customer using a payment card (e.g., a credit card, debit card, an Electronic Balanced Transaction (EBT) card, a pre-paid card, among others). In another example, the POS DEVICE 104 can communicate a payment in a Java POS format, an Extensible Markup Language (XML) format, a Web Services format, an APACS70 format, or another payment format, among others.

The web-based device 106 can communicate a payment over the internet. The web-based device 106 can include a laptop, tablet, desktop computer, Personal Digital Assistant (PDA), phone (e.g., smartphone), or other internet connectable device. The web-based device 106 can function as a sort of POS terminal with at least a capability to receive a payment using a payment card. The web-based device 106 can communicate a payment to the conversion module 102 in a variety of formats, such as the formats discussed with regard to the POS DEVICE 104.

The ATM 108 can include a cash dispensing unit that is accessible by a customer to access money that the customer would typically get at a bank. The ATM 108 provides a convenient way for a customer to access money saved in a checking or savings account, for example, without having to physically be at the bank that is storing the money for the customer. The ATM 108 can communicate a payment to the conversion module 102 in a variety of formats, such as a format discussed with regard to the POS device 104.

The network(s) 112 can include a domestic or international network. The network 112 can include a payment recipient network. The network 112 can communicate a payment to a payment recipient in a format that is required or specified by the payment recipient. Different payment recipients can have different payment format requirements or specifications, such as a format discussed herein. The conversion module 102 can (e.g., automatically) convert a payment from a payment terminal to the payment format specified or required by an associated payment card vendor or other payment recipient. The format specified by the payment recipient can include a format similar to the formats discussed with regard to the POS device 104.

Figure 2:
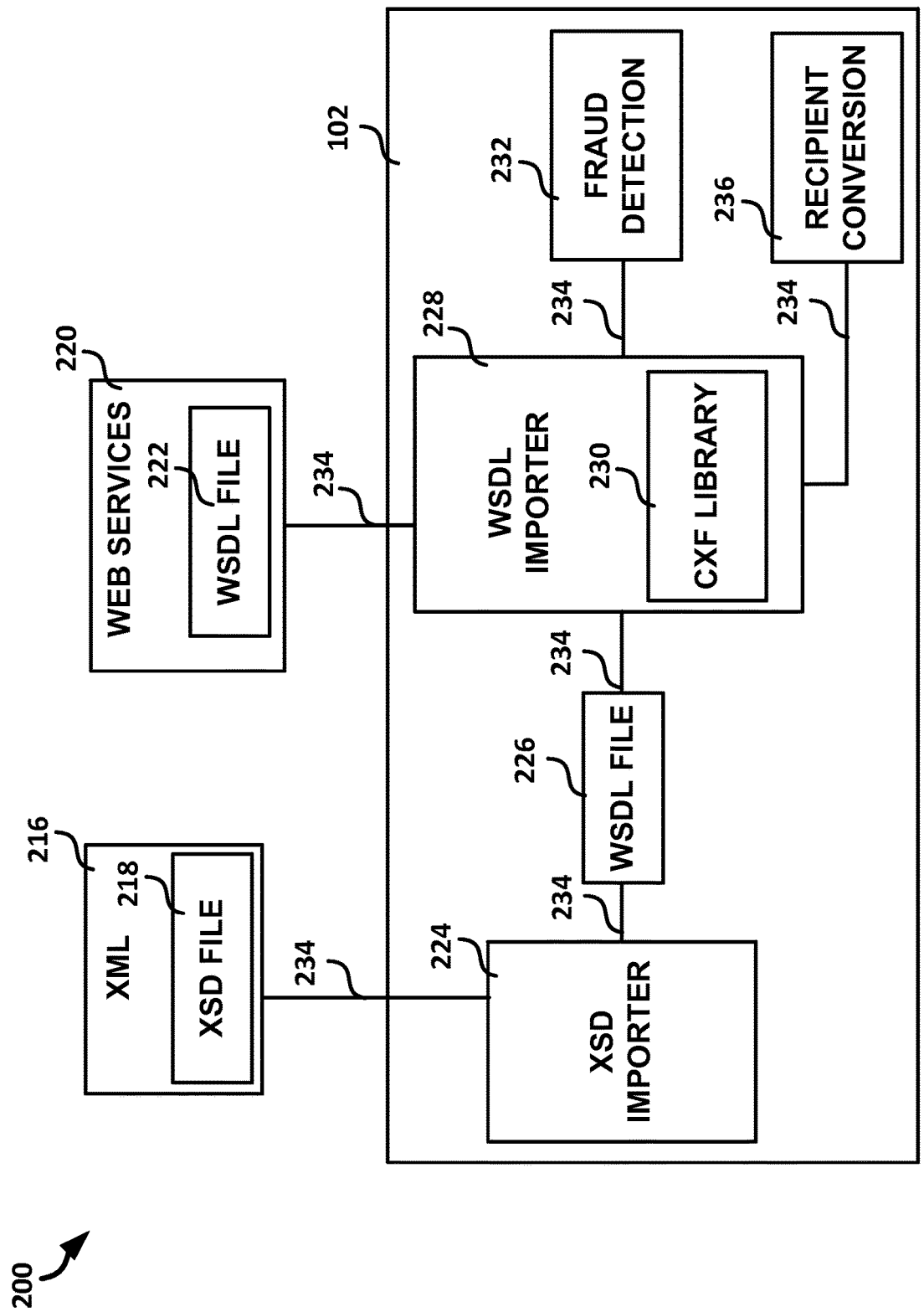
FIG. 2 is a block diagram of an example of a conversion system, in accord with one or more embodiments.

FIG. 2 shows an example of a block diagram of the conversion system 200, in accord with one or more embodiments. The conversion system 200 can include the conversion module 102.

The conversion module 102 can receive a payment 216 in an XML format or a payment 220 in a Web Services format, for example. The payment 216 can include a corresponding XML Schema Definition (XSD) file 218 that describes the elements of the payment 216. The XSD file 218 can include a collection of metadata that describes the makeup of one or more schema components in the payment 216. The schema components can include an element declaration, attribute declaration, a simple or complex type definition, a model or attribute group definition, an attribute use definition, an element particle definition, an annotation, a notation, a schema component, or a combination thereof, among others.

The payment 216 and the corresponding XSD file 218 can be input to an XSD importer 224. The XSD importer 224 can create a Web Serviced Description Language (WSDL) file 226 based on the XSD file 218 and the payment 216. A schema component of the XSD file 218 can be mapped to a WSDL port, message, port type, or a combination thereof. The WSDL mapping of the XSD components can be stored in a WSDL file 226. The WSDL file can describe a payment as a collection of ports (e.g., network endpoints). A port is a reusable binding with an associated network address. A collection of ports is considered a service. A message is a definition of data to be exchanged and a port type describes an operation supported by a web service. The WSDL file 226 generally describes an interface to a web service. A computing machine can read the WSDL file to determine the operations available using the web service and also the input and output data configuration required by the web service.

An advantage of working with a WSDL file over an XSD file includes the WSDL file defining the operations of a message (e.g., payment) exchange by defining both the input and output. The XSD importer 224 can provide an interface for a user to select a message element (e.g., an XSD component) from the XSD file and to match the XSD component to a WSDL element.

The payment 220 in the Web Services format can include a WSDL file 222. The WSDL file 222 can include information similar to the WSDL file 226, with the WSDL file 222 describing the payment 220, while the WSDL file 226 describes the payment 216.

The WSDL importer 228 can consume the WSDL file 226 or 222 and produce a representation of the payment 216 or 220, respectively, in a unified format. The unified format can include a Java Hash Tag format, in one or more embodiments. The WSDL importer 228 can use a CXF library 230 (from Apache) to convert data from a WSDL file 226 or 222 to source or object code (e.g., Java source or object code). The code created using the CXF library 230 can include one or more files describing (e.g., in Java) an interface a Web Service implements, an endpoint a user will use to make a request on the Web Service, an implementation class that describes how the Web Service is implemented, or a function that allows the Web Service to be deployed as a standalone process, among others.

In one or more embodiments, during an import process, WSDL can be converted to Java code and configuration (that can be stored on a database). This can be done by the WSDL Importer 228. In one or more embodiments, during runtime, a CXF object generated by the CXF library can be converted to a Java HashMap using the configuration and the generated Java code.

In one or more embodiments, converting the information in a WSDL file to a map format can include defining a field that includes a field name, a format definition, a relational attribute, a data type, a minimum/maximum length, a character set, a group sequence, padding character(s), terminator details, or a masking, among others. A field format can include a fixed singular variable, a fixed group variable, a two digit lead length variable (LLVAR) or a three digit lead length variable (LLLVAR), a two digit lead length group of variables (LLVAR Group), a bitmap (e.g., an extended bitmap), an XML root, or an XML element, among others. The data type can include a Java data type or other map format data type. The data type can include, for example, a string, integer, float, Boolean, double, character, byte, or a long, among others. A field can be a secure field, such that a field can be stored encrypted, such as by using the HSM 110 (HSM not shown in FIG. 2). The character set of the field can include American Standard Code for Information Interchange (ASCII), Extended Binary Coded Decimal Interchange Code (EBCDIC), binary coded decimal, binary, or hexadecimal, among others.

The code generated using the WSDL importer 228 can be indexed in a map (e.g., a Java HashMap). The map can include a sequence structure that can be used to store an object. The map can use an object reference as an index. The map can sometimes be referred to as an associative array or a dictionary, because it can associate a piece of data (e.g., an object, variable, etc.) to another piece of data.

The data generated using the WSDL importer 228 can be sent to a fraud detection module 232. The fraud detection module 232 can convert a payment in the unified format to a format compatible with a fraud detection system. After, before, or during fraud detection (fraud detection is optional), the unified payment can be converted to a format specified or required by a payment recipient, such as by using the recipient conversion module 236.

The recipient conversion module 236 can convert a payment in a map format to a format specified or required by a payment recipient. The recipient can include a payment card vendor, such as Visa, MasterCard, American Express, Discover, a bank, or other financial institution, a bank, or other recipient that accepts a payment using a payment terminal. The recipient format can vary depending on the specification or requirements of the recipients. One or more recipients may require the payment to be in an ISO 8583 format, or other format.

A connection 234 between elements of the conversion system 200 can include a wired or wireless connection. The payment 216 or 220 can be transmitted to the conversion module 102 (over the connection 234) using a Transmission Control Protocol (TCP)/Internet Protocol (IP), a Hypertext Transfer Protocol (HTTP), a File Transfer Protocol (FTP), Telnet, Simple Mail Transfer Protocol (SMTP), or other communication protocol.

In addition to the above, the importer utilities (e.g., the WSDL importer 228 or the XSD importer 224) are able to generate connector definitions to enable the application to publish and consume web-services, such as by using a JAX-WS connector definition. Such a utility can create additional configuration data that can reduce setup time for a web service.

Figure 3:
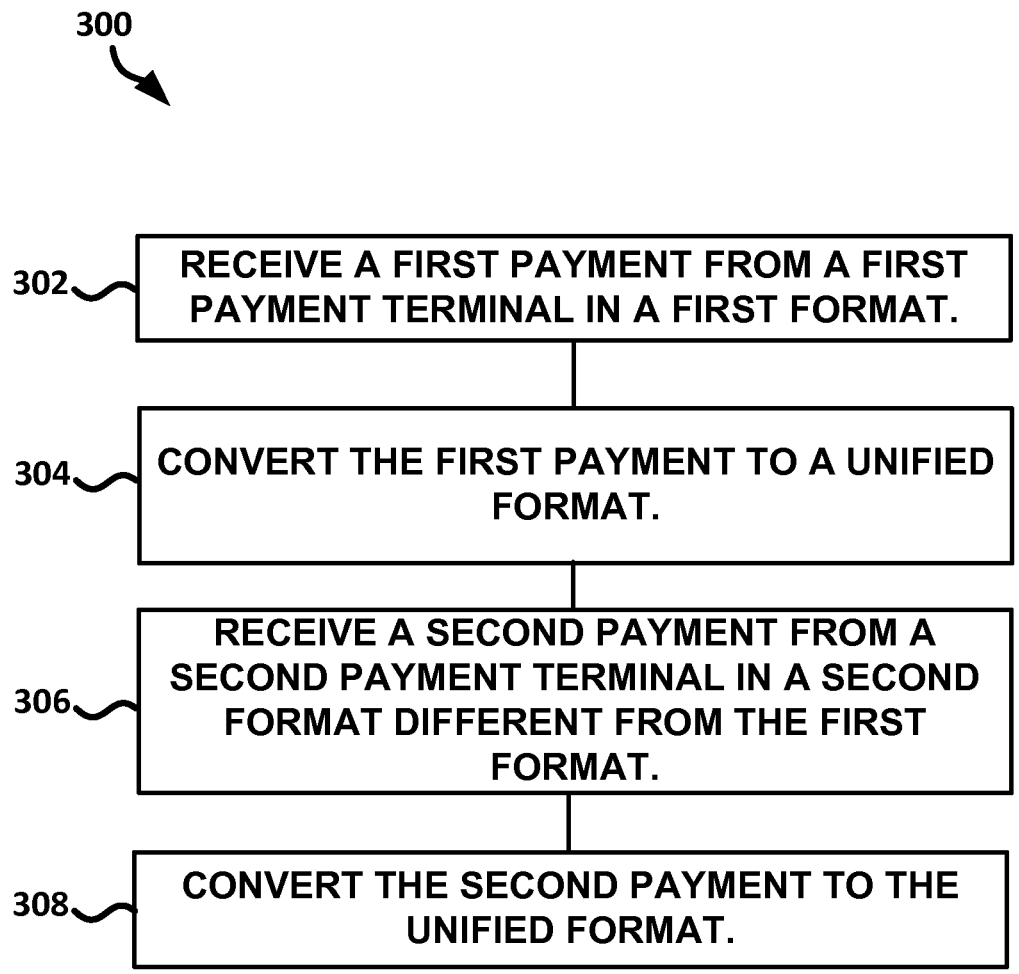
FIG. 3 is a flowchart illustrating a method for converting payments in varying formats to a unified format, in accord with one or more embodiments.

FIG. 3 is a flowchart illustrating a method 300 implemented by the system 100, the conversion module 102, the conversion system 200, or a combination thereof, in accord with one or more embodiments. Method 300 may be at least partially implemented in firmware, hardware, software running on a processor, or a combination thereof. The method 300 as illustrated includes: receiving a first payment from a first payment terminal in a first format, at operation 302; converting (e.g., automatically) the first payment to a unified format, at operation 304; receiving a second payment from a second payment terminal in a second format different from the first format, at operation 306; and converting (e.g., automatically) the second payment to the unified format.

The first format can include a Web Services format. The second format can include an XML format. The operation at 304 can include generating source and object code (e.g., Java source and object code) based on a definition of the first payment in an associated WSDL file. The source and object code can be generated using a CXF library.

The operation at 304 can include generating configuration data based on the WSDL file and the generated source and object code. In an embodiment in which the second format is an XML format the operation at 308 can include generating a WSDL file based on an XSD file associated with the second payment. Such an embodiment can include generating source and object code based on the definition of the second payment in the generated WSDL file. The unified format can include a map format (e.g., a Java HashMap format). The method 300 can include converting (e.g., automatically) the first and second payment from the unified format to a third format specified by a recipient of the first or the second payment.

Figure 4:
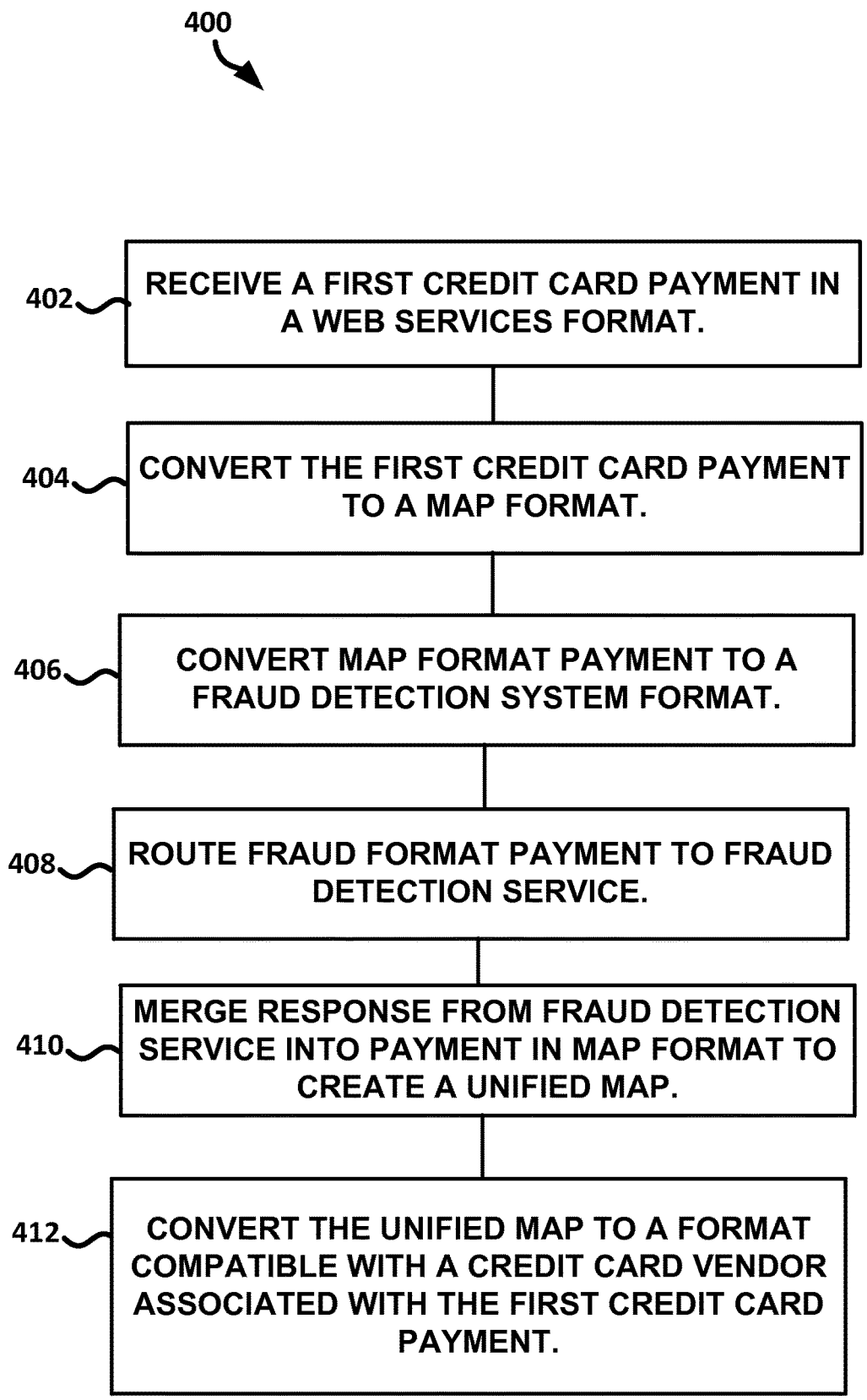
FIG. 4 is a flowchart illustrating another method for converting payments in varying formats to a map format, in accord with one or more embodiments.

FIG. 4 is a flowchart illustrating another method 400 implemented by the system 100, the conversion module 102, the conversion system 200, or a combination thereof, in accord with one or more embodiments. Method 400 may be at least partially implemented in firmware, hardware, software running on a processor, or a combination thereof. The method 400 as illustrated includes: receiving a first credit card payment in a Web Services format, at operation 402; converting (e.g., automatically) the first credit card payment to a map format, at operation 404; converting (e.g., automatically) the map format payment to a fraud detection system format, at operation 406, routing the fraud format message to a fraud detection service, at operation 408; merging a response from the fraud detection service into the payment in map format to create a unified map, at operation 410; and converting (e.g., automatically) the first credit card payment in the unified map to a format compatible with a credit card vendor associated with the first credit card payment, at operation 412.

The operation at 404 can include generating source and object code based on a definition of the first credit card payment in a WSDL file associated with the first credit card payment. The source and object code can be generated using a CXF library. The operation at 404 can include generating configuration data based on the WSDL file and the generated source and object code. The method 400 can include generating a WSDL file based on an XSD file associated with a second credit card payment received. The map format can include a Java HashMap format.

The method 400 can include converting a third credit payment in an ISO 8583 or APACS70 format to the map format and converting the third credit card payment in the map format to the format compatible with the credit card vendor or other payment recipient or fraud detection service.

Figure 5:
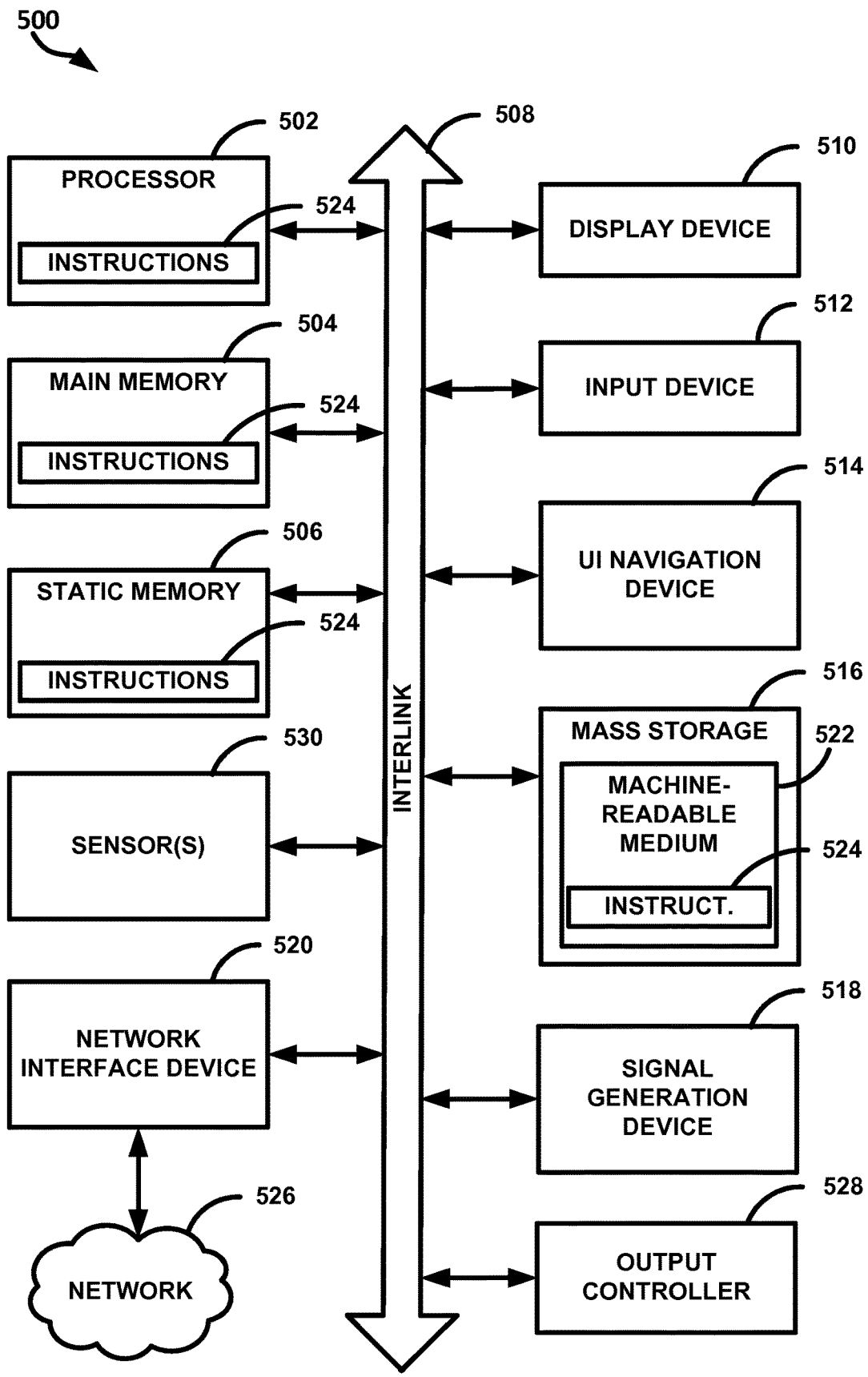
FIG. 5 is a block diagram of a computing machine, in accord with one or more embodiments.

FIG. 5 is a block diagram illustrating an example machine upon which any one or more of the methods discussed can be run. In one or more embodiments, the conversion module 102, the conversion system 200, the XSD importer 224, the WSDL importer 228, or the recipient conversion module 232 can include one or more items of machine 500. Machine 500 can be embodied as a computing device, providing operations of the conversion module 102, the conversion system 200, the XSD importer 224, the WSDL importer 228, or the recipient conversion module 232, or any other processing or computing platform or component described or referred to herein. In alternative embodiments, the machine 500 operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), such as a PC that can be portable (e.g., a notebook or a netbook) or a PC that is not conveniently portable (e.g., a desktop PC), a tablet, a set-top box (STB), a gaming console, a Personal Digital Assistant (PDA), a mobile telephone or Smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Implementing techniques using computer processors and other logic can lead to automated camera condition change detection (e.g., that does not include human interference).

Example machine 500 can include a processor 502 (e.g., a central processing unit (CPU), a graphics processing unit (GPU) or both), a main memory 504 and a static memory 506, which communicate with each other via an interconnect 508 (e.g., a link, a bus, etc.). The machine 500 can further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are a touch screen display. The machine 500 can include a storage device 516 (e.g., a drive unit), a signal generation device 518 (e.g., a speaker), an output controller 528, or a network interface device 520 (which can include or operably communicate with one or more antennas, transceivers, or other wireless communications hardware), or one or more sensors 530, such as a GPS sensor, compass, location sensor, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the machine 500, with the main memory 504, static memory 506, or the processor 502 also constituting machine-readable media. The processor 502 configured to perform an operation can include configuring instructions of a memory or other machine-readable media coupled to the processor, which when executed by the processor, cause the processor 502 to perform the operation.

While the machine-readable medium 522 is illustrated in an example embodiment to be a single medium, the term "machine-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding, or carrying data structures utilized by or associated with such instructions. The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES AND EXAMPLES

The present subject matter can be described by way of several examples.

Example 1 can include or use subject matter (such as an apparatus, a method, a means for performing acts, or a device readable memory including instructions that, when performed by the device, can cause the device to perform acts), such as can include or use receiving a first payment from a first payment terminal in a first format, automatically converting the first payment to a unified format, receiving a second payment from a second payment terminal in a second format different from the first format, or automatically converting the second payment to the unified format.

Example 2 can include or use, or can optionally be combined with the subject matter of Example 1, to include or use, wherein the first format is a Web Services format.

Example 3 can include or use, or can optionally be combined with the subject matter of at least one of Examples 1-2, to include or use, wherein the second format is an Extensible Markup Language (XML) format.

Example 4 can include or use, or can optionally be combined with the subject matter of at least one of Examples 1-3, to include or use, wherein automatically converting the first payment to the unified format includes generating Java source and object code based on a definition of the first payment in an associated Web Service s Description Language (WSDL) file.

Example 5 can include or use, or can optionally be combined with the subject matter of Example 4, to include or use, wherein generating Java source and object code based on the definition of the first payment includes using a CXF library to generate the Java source and object code.

Example 6 can include or use, or can optionally be combined with the subject matter of at least one of Examples 4-5, to include or use, wherein automatically converting the first payment to the unified format includes generating configuration data based on the WSDL file and the generated Java source and object code.

Example 7 can include or use, or can optionally be combined with the subject matter of at least one of Examples 1-6, to include or use, wherein the second format is an XML format and automatically converting the second payment to the unified format includes generating a WSDL file based on an XML Schema Definition (XSD) file associated with the second payment and generating Java source and object code based on the definition of the second payment in the generated WSDL file.

Example 8 can include or use, or can optionally be combined with the subject matter of at least one of Examples 1-7, to include or use, wherein the unified format is a Java HashMap format.

Example 9 can include or use, or can optionally be combined with the subject matter of at least one of Examples 1-7, to include or use automatically converting the first and second payment from the unified format to a third format specified by a recipient of the first or the second payment.

Example 10 can include or use, or can optionally be combined with the subject matter of Examples 1-9, to include or use wherein automatically converting the second payment to the unified format includes generating Java source and object code based on a definition of the second payment in the WSDL file generated based on the XSD file associated with the second payment.

Example 11 can include or use, or can optionally be combined with the subject matter of Example 10, to include or use, wherein generating Java source and object code based on the definition of the second payment includes using a CXF library to generate the Java source and object code.

Example 12 can include or use, or can optionally be combined with the subject matter of at least one of Examples 10-11, to include or use, wherein automatically converting the second payment to the unified format includes generating configuration data based on the generated WSDL file and the generated Java source and object code.

Example 13 can include or use, or can optionally be combined with the subject matter of at least one of Examples 1-12, to include or use, wherein the first or second payment is a credit card payment.

Example 14 can include or use, or can optionally be combined with the subject matter of at least one of Examples 1-13, to include or use, wherein the third format is a format specified or required by a credit card vendor or a bank.

Example 15 can include or use subject matter (such as an apparatus, a method, a means for performing acts, or a device readable memory including instructions that, when performed by the device, can cause the device to perform acts), such as can include or use receiving a first credit card payment in a Web Services format, automatically converting the first credit card payment to a map format, receiving a second credit card payment in an XML format, automatically converting the second credit card payment to the map format, or converting the first and second payments in the map format to a format compatible with a credit card vendor associated with the first and second credit card payments.

Example 16 can include or use, or can optionally be combined with the subject matter of Example 15, to include or use, wherein automatically converting the first credit card payment to the unified format includes generating source and object code based on a definition of the first credit card payment in a WSDL file associated with the first credit card payment.

Example 17 can include or use, or can optionally be combined with the subject matter of Example 16, to include or use, wherein generating source and object code based on the definition of the first credit card payment includes using a CXF library to generate the source and object code.

Example 18 can include or use, or can optionally be combined with the subject matter of at least one of Examples 15-17, to include or use wherein automatically converting the first and second credit card payments in the unified format to the map format includes generating configuration data based on the WSDL file and the generated source and object code.

Example 19 can include or use, or can optionally be combined with the subject matter of at least one of Examples 15-18, to include or use, wherein converting the second credit card payment to the map format includes generating a WSDL file based on an XML Schema Definition file associated with the second credit card payment or wherein the map format includes a Java HashMap format.

Example 20 can include or use, or can optionally be combined with the subject matter of at least one of Examples 15-19, to include or use converting a third credit payment in an ISO 8583 format to the map format and converting the third credit card payment in the map format to the format compatible with the credit card vendor.

Example 21 can include or use subject matter (such as an apparatus, a method, a means for performing acts, or a device readable memory including instructions that, when performed by the device, can cause the device to perform acts), such as can include or use processing circuitry to execute modules comprising a first conversion module to automatically convert first and second payments to a unified format, wherein the first payment is in a first format different from the format of the second payment, or a vendor conversion module to automatically convert the payments in the unified format to a third format different from the first and second formats.

Example 22 can include or use, or can optionally be combined with the subject matter of Example 21, to include or use, wherein the first conversion module to automatically convert the first payment to the unified format includes the conversion module to generate source and object code based on a definition of the first payment in an associated WSDL file.

Example 23 can include or use, or can optionally be combined with the subject matter of Example 22, to include or use, wherein the first conversion module to generate source and object code based on the definition of the first payment includes the conversion module to use a CXF library to generate the source and object code.

Example 24 can include or use, or can optionally be combined with the subject matter of at least one of Examples 22-23, to include or use, wherein the first conversion module to automatically convert the first payment to the unified format includes generating, using a WSDL importer, configuration data based on the WSDL file and the generated source and object code.

Example 25 can include or use, or can optionally be combined with the subject matter of at least one of Examples 21-24, to include or use, wherein the second file format is an XML format and the first conversion module to automatically convert the second payment to the unified format includes the first conversion module to, using an XSD importer, generate a WSDL file based on an XSD file associated with the second payment.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in another manner.

Furthermore, although the software modules are illustrated as executing on one piece of hardware, the software may be distributed over multiple processors or processing circuitry of a single device, or in another manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate embodiment.

The invention claimed is:

1. A method comprising:

receiving, by instructions that are executed by a processor of a computing device from a non-transitory computer-readable storage medium, a first payment from a first payment terminal in a first format, wherein receiving further includes representing the first payment as a first collection of network endpoints associated with a first service;

automatically converting, by the instructions, the first payment to a unified format using the first service, wherein automatically converting further includes providing a first field of the first payment in the unified format to a Hardware Security Module (HSM) that encrypts that first field for security;

receiving, by the instructions, a second payment from a second payment terminal in a second format different from the first format, wherein receiving further includes representing the second payment as a second collection of network endpoints associated with a second service;

automatically converting, by the instructions, the second payment to the unified format using the second service, wherein the first format is different from the second format, wherein automatically converting further includes providing a second field of the second payment in the unified format to the HSM that encrypts that second field for security;

providing, by the instructions, a unified payment representing the first and second payments in the unified format to a fraud detection module;

receiving, by the instructions, an indication from the fraud detection module that indicates whether one or more of the first and second payments are directed to fraud or not; and processing, by the instructions, the first payment and the second payment in the unified payment as a particular payment needed for a transaction when the indication indicates no fraud was detected by the fraud detection module, wherein processing further includes further converting the unified payment from the unified format to a recipient-defined format using the HSM for the first field and the second field when processing the unified payment.

2. The method of claim 1, wherein the first format is a Web Services format.

3. The method of claim 1, wherein the second format is an Extensible Markup Language (XML) format.

4. The method of claim 1, wherein automatically converting the first payment to the unified format includes generating Java source and object code based on a definition of the first payment in an associated Web Services Description Language (WSDL) file.

5. The method of claim 4, wherein generating Java source and object code based on the definition of the first payment includes using a CXF library to generate the Java source and object code.

6. The method of claim 4, wherein automatically converting the first payment to the unified format includes generating configuration data based on the WSDL file and the generated Java source and object code.

7. The method of claim 6, wherein the second format is an XML format and automatically converting the second payment to the unified format includes generating a WSDL file based on an XML Schema Definition (XSD) file associated with the second payment and generating Java source and object code based on the definition of the second payment in the generated WSDL file.

8. The method of claim 1, wherein the unified format is a Java HashMap format.

9. The method of claim 1, further comprising, automatically converting the first and second payment from the unified format to a third format specified by a recipient of the first or the second payment.

10. A method comprising:

receiving, by instructions that are executed by a processor of a computing device from a non-transitory computer-readable storage medium, a first credit card payment in a Web Services format from a first payment terminal, wherein receiving further includes representing the first credit card payment as a first collection of network endpoints associated with a first service;

automatically converting, by the instructions, the first credit card payment to a map format using the first service, wherein automatically converting further includes providing a first field of the first credit card payment in the map format to a Hardware Security Module (HSM) that encrypts that first field for security;

receiving, by the instructions, a second credit card payment in an Extensible Markup Language (XML) format from a second payment terminal, wherein receiving further includes representing the second credit card payment as a second collection of network endpoints associated with a second service;

automatically converting, by the instructions, the second credit card payment to the map format using the second service, wherein the Web Services format is different from the XML format, wherein automatically converting further includes providing a second field of the second credit card payment in the map format to the HSM that encrypts that second field for security;

providing, by the instructions, a unified payment representing the first and second credit card payments in the map format to a fraud detection module for determining whether fraud exists with one or more of the first and second credit card payments;

receiving, by the instructions, an indication from the fraud detection module that indicates whether one or more of the first and second credit card payments are directed to fraud or not; and converting, by the instructions and when the indication indicates that no fraud was detected by the fraud detection module, the first and second payments in the map format to a format compatible, using the HSM for the first field and the second field, with a credit card vendor associated with the first and second credit card payments and processing the first credit card payment and the second credit card payment in the format compatible with the credit card vendor as a particular payment needed for a transaction and as defined by a recipient conversion module of the credit card vendor.

11. The method of claim 10, wherein automatically converting the first credit card payment to the unified format includes generating source and object code based on a definition of the first credit card payment in a Web Services Description Language (WSDL) file associated with the first credit card payment.

12. The method of claim 11, wherein generating source and object code based on the definition of the first credit card payment includes using a CXF library to generate the source and object code.

13. The method of claim 10, wherein automatically converting the first and second credit card payments in the unified format to the map format includes generating configuration data based on the WSDL file and the generated source and object code.

14. The method of claim 10, wherein converting the second credit card payment to the map format includes generating a WSDL file based on an XML Schema Definition file associated with the second credit card payment and wherein the map format includes a Java HashMap format.

15. The method of claim 10, further comprising converting a third credit payment in an ISO 8583 format to the map format and converting the third credit card payment in the map format to the format compatible with the credit card vendor.

16. A payment conversion device comprising processing circuitry to execute modules comprising:
a computing device including a processor and non-transitory a computer-readable storage medium having instructions representing a first conversion module and a vendor conversion module;
the first conversion module when executed by the processor from the non-transitory computer-readable storage medium causes the processor to:
automatically convert first and second payments to a unified format and using a Hardware Security Module (HSM) that encrypts first fields of the first payments in the unified format and second fields of the second payments in the unified format for security, wherein the first payment is in a first format different from the format of the second payment, and wherein the first payment received from a first payment terminal and the second payment received from a second payment terminal, wherein the first payment represented as a first collection of network endpoints associated with a first service, and the second payment represented as a second collection of network endpoints associated with a second service, and wherein the first payment is automatically converted to the unified format using the first service and the second payment is automatically converted to the unified format using the second service;
provide a unified payment representing the first and second payments in the unified format to a fraud detection module to determine whether there is any fraud associated with one or more of the first and second payments; and
determine whether one or more of the first and second payments are directed to fraud or not based on an indication received back from the fraud detection module; and
the vendor conversion module when executed by the processor from the non-transitory computer-readable storage medium causes the processor to:
automatically convert, when the indication indicates that there is no fraud detected by the fraud detection module, the payments in the unified format to a third format different from the first and second formats using the HSM for the first fields and the second fields, wherein the payments are provided in the third format as a particular payment needed for a transaction.

17. The device of claim 16, wherein the first conversion module when executed by the processor from the non-transitory computer-readable storage medium further causes the processor to generate source and object code based on a definition of the first payment in an associated Web Services Description Language (WSDL) file.

18. The device of claim 17, wherein the first conversion module when executed by the processor from the non-transitory computer-readable storage medium causes the processor to use a CXF library to generate the source and object code.

19. The system of claim 18, wherein the first conversion module when executed by the processor from the non-transitory computer-readable storage medium causes the processor to generate and use a WSDL importer, configuration data based on the WSDL file and the generated source and object code.

20. The device of claim 18, wherein the second file format is an Extensible Markup Language (XML) format and the first conversion module when executed by the processor from the non-transitory computer-readable storage medium causes the processor to use an XSD importer, and generate a WSDL file based on an XML Schema Definition (XSD) file associated with the second payment.

* * * * *